(12) United States Patent
Saigh et al.

(10) Patent No.: US 8,013,734 B2
(45) Date of Patent: Sep. 6, 2011

(54) PERSONAL SAFETY MOBILE NOTIFICATION SYSTEM

(75) Inventors: Michael Saigh, Las Cruces, NM (US); Kevin R. Arndt, Summit Hill, PA (US)

(73) Assignee: Autocart LLC, St. Louis, MO (US)

( * ) Notice: Subject to any disclaimer, the term of this patent is extended or adjusted under 35 U.S.C. 154(b) by 755 days.

(21) Appl. No.: 12/011,577

(22) Filed: Jan. 28, 2008

(65) Prior Publication Data

US 2008/0284587 A1 Nov. 20, 2008

Related U.S. Application Data

(60) Provisional application No. 60/930,093, filed on May 14, 2007.

(51) Int. Cl.
*G08B 1/08* (2006.01)
(52) U.S. Cl. ........... 340/539.13; 340/539.1; 340/539.11; 340/541; 340/573.1; 340/825.49; 455/404.1; 455/521
(58) Field of Classification Search ............. 340/539.11, 340/539.13, 541, 573.1, 539.1, 825.49; 455/404.1, 455/456.1, 521
See application file for complete search history.

(56) References Cited

U.S. PATENT DOCUMENTS

| 5,929,777 | A  | * | 7/1999  | Reynolds ................ 340/825.49 |
| 6,044,257 | A  | * | 3/2000  | Boling et al. ............. 455/404.2 |
| 7,233,781 | B2 | * | 6/2007  | Hunter et al. ............. 455/404.1 |
| 7,251,471 | B2 | * | 7/2007  | Boling et al. ............. 455/404.2 |
| 7,259,694 | B2 | * | 8/2007  | Myllymaki et al. .......... 340/993 |
| 7,308,246 | B2 | * | 12/2007 | Yamazaki et al. ......... 455/404.1 |
| 7,355,507 | B2 | * | 4/2008  | Binning ....................... 340/332 |
| 2007/0182548 | A1 | * | 8/2007 | Raad ....................... 340/539.13 |

* cited by examiner

*Primary Examiner* — Hung T. Nguyen

(57) ABSTRACT

Described embodiments provide a method of alarm notification. An alert mode of a mobile device is activated based on an emergency situation in an area. The mobile device transmits an indication of the emergency situation to a communication network control system. The communication network control system confirms the indication of the emergency situation to the mobile device and notifies emergency personnel of the indication of the emergency situation. The communication network control system transmits an indication of the emergency situation to one or more additional mobile devices in the area.

28 Claims, 8 Drawing Sheets

PERSONAL SAFETY MOBILE NOTIFICATION SYSTEM

CLAIM OF PRIORITY

The present invention claims priority based upon U.S. Provisional Patent Application No. 60/930,093, filed May 14, 2007 to Saigh et al. and titled "Personal Safety Mobile Notification System" which is hereby incorporated by reference.

FIELD OF INVENTION

The present invention is generally directed towards methods, systems and apparatus for transmitting and communicating alarm events, and more specifically, the present invention discloses a Personal Safety Mobile Notification System (PMNS) that in one embodiment is utilized for the safety of the general public in any location for any dangerous or threatening situation. The network could then, in yet another embodiment, be constructed to the specifications of the business, campus, geography, security force, structure, vehicle or any organization or residence as previously described.

In one embodiment of this invention, the user could be notified that their mobile device requires a software, firmware and/or hardware upgrade to implement the present invention. This upgrade could be conducted by the individual's own mobile device provider. This would now be one of many mobile devices connected to the disclosed network that would be alerted at the approximately exact time danger is discovered within the pre-determined geographical range of the PSNMS individual emergency alert system.

BACKGROUND OF THE INVENTION

With the advent of cell or mobile phone technology, people throughout the world can now communicate with anyone on the planet from almost any geographic location near a cell or mobile phone tower. Current cell phone technology allows for the storage of data (such as contact information), to-do lists, and appointments and schedules. Cell phones also serve as a mini-computer system, as they allow for calculation of simple math functions, can send and receive electronic mail, can send and receive video and audio signals, can access the Internet, can act as a gaming system, and can also be integrated with other electronic equipment (such as, for example, cell phones, personal digital assistants, MP3 players, MP4 players, mpeg players, laptops, computer systems, global positioning receivers, and like mobile devices).

The foundation of a cellular phone system is based upon the division of a geographic area (such as a city) into "cells". Such a division allows extensive frequency or spectrum reuse across the geographic region, thereby allowing theoretically millions of people to use their cell phones simultaneously. More specifically, in a typical cell phone system, each cellphone carrier receives about 800 or more frequencies or like spectrums for use in a specific geographic location. The carrier then divides a geographic location into cells, and places multiple cellular towers to cover smaller portions of the geographic location. Each cellular tower can be sized to cover approximately 10 square miles, and each cell is typically defined as hexagons on a big hexagonal grid (although the tower's signal transmission is radial in scope). Of course, the signal strength of each cell tower may be adjusted for geographic location (e.g., a strong signal may be needed for rural Iowa which may not have many cellular towers, and a weak signal may be needed for urban New York city, where the population is dense). Each cellular tower has a base station (or, base transceiver station) that consists of a tower and a corresponding small housing containing a power source and communication/radio equipment which is in communication with other cellular towers, the cell phone carrier's computer and communication equipment, and the Internet as well. Because cell phones and base stations use low-power transmitters, the same frequencies can be reused in non-adjacent cells within the geographic area.

Each carrier in each geographic area also runs one or more central offices called the Mobile Telephone Switching Office (MTSO), which communicates with each cell tower/base station in the geographic area through one or more MTSO computer and communication systems. The acronym "MTSO" is a term that was commonly used in the communications industry, but which is now commonly referred to as the mobile switching center (MSC). As defined in this disclosure, the phrase "public land mobile network" ("PLMN") will be used to represent the entire mobile device communication network, regardless of the type of technology used in the communication network (e.g., GSM, PCS, CDMA, UMTS, etc). The PLMN computer and communication systems handles all of the phone connections from the cellular towers to other cellular towers, and also connections from a cellular tower to the normal land-based phone system, and controls all of the base stations in the region (whether inter-carrier or intra-carrier). While the term "cell" or "cellular" is used herein to refer to certain type of mobile device communication protocols, this term is used in its broadest sense, and therefore, includes technology covered by personal communications service ("PCS") protocol, and the Global System for Mobile communications ("GSM") protocol as is common in Europe and the like.

Generally, the type of electronic, computer and communication systems used by PLMN networks for cell phone communication vary in scope, but in general, the PLMN networks have at a minimum, one or more computer servers that can control communication signals to and from mobile devices, can store and access databases full of contact information, include hardware and software that can hold messages for direction to the correct recipients, include storage drives for archiving messages and replies, and include software that can analyze and record responses to messages and encryption tools for use when handling sensitive information.

It is well known in the art that cell phones are full duplex devices, which means that based on multiple communication frequency technologies and frequency shifting techniques, the cellular communication may theoretically allow for each person in the communication string to talk at once. A typical cell phone can communicate on up to 1,663 frequencies (or, channels), and more are contemplated. Because cell phones operate within a cell, such phones can switch cells as the phone is moved between geographic areas, thereby giving the illusion that the phone has a very wide geographic range of use. This means that (assuming power is available) a cell phone user can move theoretically thousands of miles and maintain a constant communication.

Currently, every cell phone has a pre-determined special code associated with it, which is used to identify the specific phone, the phone's owner and the phone's service provider. Currently, each phone has an Electronic Serial Number (ESN), a Mobile Identification Number (MIN), and a System Identification Code (SID). The ESN is a unique 32-bit number programmed into the phone when it is manufactured. The MIN is currently a 10-digit number derived from the phone's number. The SID is a unique 5-digit number that is assigned to each carrier by the Federal Communication Commissioner (FCC). While the ESN is considered a permanent part of the phone, both the MIN and SID codes are programmed into the phone when the cell phone is activated by a carrier. Moreover, the ESN protocol is now being replaced by Mobile Equipment IDentifier (MEID) codes because the ESN range of codes are becoming depleted The MEID protocol implements 56 bit numbers, and thus, will have a larger number of available codes to accommodate the increasing use of mobile devices as compared to twenty years ago when ESN was developed.

When a cell phone is first activated, it transmits a signal seeking the nearest cellular tower/base station. More specifically, the cell phone attempts to receive an SID on at least one control channel. The control channel is a special frequency that the phone and cellular tower/base station use to communicate. If the cell phone cannot find any control channels to listen to, this means that the cell phone is out of range of any cellular tower, and the phone is usually programmed to display a "no service" or similar message. When a cell phone receives the SID from the cellular tower/base station, the phone is programmed to compare the SID signal with the SID number programmed into the phone.

Obviously, most if not all of these seemingly automated functions of the cell phone are performed through software stored in each cell phone. If the two SIDs match, the phone is programmed to know that the cellular system it is communicating with is part of its home system (or, the home carrier's system). Along with the SID, the cell phone is also programmed to transmit a registration request, so that the PLMN can keep track of the cell phone's approximate geographic location in a database. The PLMN network's tracking of the cell phone's geographic location is used mainly to compute which cell phone tower is nearest the cell phone as the cell phone moves, so as to allow for more efficient communication switching when the phone is mobile. Thus, for example, when the PLMN's computer and communication system is notified electronically that an incoming communication for a particular cell phone has arrived, the PLMN's computer and communication system (also referred to herein as a "PLMN computer", "PLMN computer system", "PLMN network", or simply, "network") can then locate the particular cell phone in its database, locate the nearest cellular tower, and forward the incoming call to the nearest cellular tower to complete the communication path. As part of this process, the PLMN's network picks a frequency pair that the cell phone will use in that particular cell region to take the call. The PLMN network also communicates with the cell phone over the control channel to control which frequencies to use, and once the cell phone and the nearer tower switch to those frequencies, the call is connected.

As the cell phone is moved to the end of a cellular tower's range, the cellular tower's base station notes that the cell phone's signal strength is diminishing. Concurrently, the cellular tower/base station in the cell that the cell phone is moving toward has been in contact with the PLMN's network to let the PLMN computer system know that the cell phone's signal strength is increasing. The two base stations coordinate with each other through the PLMN computer system, and upon a pre-programmed event on the PLMN computer system, the cell phone receives a signal on one or more control channels commanding the mobile device to change frequencies corresponding to the new cellular tower (so that the cell phone's communication is handed off from a remotely located base station to a nearer base station). Of course, this process is slightly different if a cell phone moves from one carrier service to another carrier service, but the overall process is basically the same.

Currently, a conventional cell phone housing contains many integrated parts, including a control circuit board (or, computer control system), an antenna, one or more displays such as a liquid crystal display (LCD), a keyboard, a microphone, a power source such as a battery, and a speaker, all in electronic communication with each other. The control circuit board includes, typically, a programmable microprocessor, analog-to-digital and digital-to-analog conversion chips, control amplifiers and storage electronics (such as ROM, RAM, DRAM, EPROM, flash memory, and like electronics), all in communication with one another.

Under older communication signal transmission methodologies (namely, digital communication technologies known as "2G", representative for second generation of phones), there are three basic forms of transmission of signals between a cell phone and a cellular tower/base station: Frequency division multiple access (FDMA), Time division multiple access (TDMA), and Code division multiple access (CDMA). Each of these transmission technologies allow a signal to be split according to the requirements of each method, but each method has a different way of splitting the communication signal (e.g., FDMA puts each call on a separate frequency, TDMA assigns each call a certain portion of time on a designated frequency, and CDMA gives a unique code to each call and spreads it over the available frequencies). Some cellular phones are programmed exclusively with any of these transmission methodologies, but other phones are programmed so that the cellular phone optimizes the transmission method. Thus, some cell phones are known as "multiple band" (e.g., a cell phone that has multiple-band capability can switch frequencies), "multiple mode" (e.g., a cell phone which can switch between signal transmission modes) or "multiple band/Multiple mode" (which combines the technology of the two former transmission methods into a single cell phone).

With the further development of cell phone technology, cell phones are now equipped to provide an incredible array of functions, with additional functions being added almost on a daily basis by cell phone manufacturers. Thus, under 3G technology, cell phones are increasingly being made which feature increased bandwidth and transfer rates to accommodate Web-based applications and phone-based audio and video files. Under newer signal transmission methodologies (namely, digital communication technologies known as "3G" representative for third generation of phones), there are three basic forms of transmission of signals between a cell phone and a cellular tower/base station: CDMA2000 (based on 2G Code Division Multiple Access); Wideband Code Division Multiple Access ("WCDMA (UMTS)"); and Time-division Synchronous Code-division Multiple Access ("TD-SCDMA"). 3G networks have potential transfer speeds of up to 3 Mbps or more (which is about 15 seconds to download a 3-minute MP3 song). For comparison, the fastest 2G phones can achieve up to 144 Kbps (about 8 minutes to download a 3-minute song). 3G's high data rates are ideal for downloading information from the Internet and transmitting and receiving large, multimedia files. 3G phones are analogous to mini-laptop computers and are adapted to accommodate broadband applications like video conferencing, receiving streaming video from the Web, sending and receiving faxes and instantly downloading e-mail messages with attachments.

Additionally, a Subscriber Identity Module (SIM) memory card is a common feature in cell phones today. A SIM card is part of a removable smart card which securely stores a service-subscriber key (IMSI) used by a carrier to identify a subscriber. A conventional SIM card allows a cell phone user to change cell phones by simply removing the SIM card from one cell phone and inserting it into another cell phone or broadband telephony device. SIM cards can also be adapted to receive and retain SMS messages or other emergency data (such as, for example, data corresponding to a pre-recorded voice message). SIM cards may also be adapted to achieve any function which requires programmable memory.

While cell phones have certainly changed the lives of humans forever, under current technology schemes, warning the general public of danger, terrorist acts, robbery and any category of potential or actual harmful activity is currently based on a Short Message Service ("SMS") system protocol (or, "text messaging"). SMS is a method of communication that sends text characters between cell phones, or from a cell phone to a personal computer or computer network. The term "short" is used to describe this technology because it refers to the maximum size of the text characters which can be transmitted in one message or packet (typically, 160 text characters). The SMS system was developed specifically to communicate a short burst of data so as to not overload the communication system. Some cell phones are programmed to be limited to 160 characters per transmission, however, newer cell phones are programmed to store more characters, and then, send several sequential communication bursts (so, at the receiving end, there are multiple messages which arrive). A popular broadcast messaging service which uses the SMS protocol is called Twitter. Additionally, software generally referred to as a "SMSC gateway" is a software package that can be used to send/receive SMS messages either to or receive from mobile devices using various connections to Short Message Service Centers (SMSC). The SMSC Gateway uses database that checks, accepts, processes and distributes Short Messages among the SMSCs over an electronic network which is also in communication with the Internet.

As described previously, a cell phone is in almost constant communication with a nearby cellular tower/base station. Even when the cell phone is not activated, the cell phone is programmed to transmit and receive communication signals from the tower/base station over one or more communication paths known as the control channel. In this regard, the carrier's network may then maintain data representing the approximate location of the cell phone in approximately real-time. The control channel is also used for call setup. If an incoming call arises, the cellular tower sends a communication signal over the control channel to control the phone to play a ringtone, and controls the frequencies upon which the communication will take place.

The control channel also provides the pathway for the transmission of SMS messages between a cell phone and the tower/base station. Once a SMS message is created and sent from the cell phone, the message is sent to the PLMN computer system, which then routes the message to the cellular telephone network through an SMS gateway. From there, the message travels to the short message service center (SMSC). The SMSC then transmits the message to the cell phone tower nearest to the recipient cell phone, and the tower then relays the message to the recipient cell phone. Stated differently, when a text message it transmitted, a communication signal representing the message is transmitted to a cell tower (and thus, the network), flows through the SMSC, then to the recipient cell tower, and the tower sends the message to the recipient cell phone as a packet of data on the control channel.

There are several advantages to SMS. For example, SMS is a store-and-forward service, which means that once a text message is sent, the SMSC can be instructed to delay transmission to the recipient phone or computer system. One advantage of this delayed transmission method is that the recipient cell phone or computer doesn't have to be active or in range for the text message to be sent. The message is stored in the SMSC (for days, if necessary) until the recipient cell phone or computer is turned on or moves into range, at which point the SMSC delivers the text message. With some cell phones, the message will remain stored on the recipient's cell phone's memory card until it is manually deleted. In addition to person-to-person messages, SMS can be used to send a single message to a large number of people at a time, either from a list of contacts or to all the users within a particular area. This service is known as "broadcasting" and is currently used by companies to contact groups of employees or by online services to distribute news and other information to subscribers.

There are disadvantages and problems surrounding the current state of the art regarding personal safety notification systems. For example, a common complaint about SMS is its inefficient delivery structure. When the SMSC message center is backed up, messages take longer to reach their destination. To make message delivery faster, networks are now employing next-generation technologies such as General Packet Radio Service (GPRS). Another disadvantage is in the event of a localized emergency, an alert or warning communication signal needs to be sent not only to the local authorities (such as police), but also to all other persons within the localized geographic area. In this case, the message needs to reach lots of other people in the localized geographic area. As such, broadcast messaging techniques are needed to provide a broadcast warning or emergency signal to people in the localized geographic area where the emergency is taking place.

The SMS system protocol also does not provide warnings in an approximately real-time environment, so that any warnings made under this system warns individuals of immediate danger after the fact (meaning, that the SMS system warning is based on a notification of a past potentially dangerous events or actions). In addition, the current technology does not pre-warn, pre-notify or pre-alert individuals until well after the danger has taken place or occurred. Moreover, current alert systems only provide text based communication processes that are not designed specifically for prevention of immediate dangers.

In addition, current notification technologies are based on old news reporting through a mass broadcasting of an event and occurrences. Current notification systems do not alert, but rather, inform the public of past hazardous events or other information. Even though these mass broadcasts can save lives by informing the public of a news event or probable warning, it does not accommodate any "first line of defense" alert alarm notification activation. Current alert systems only provide "second line of defense" methods of the mass notification of an event. In addition, "second line defense" systems, methods and apparatuses do not proactively allow the triggering of a local alarm(s) or notification signals. In addition, this "second line of defense" mass broadcast notification method will not save the lives of individuals in harms way. For example, if a gunman is in a school setting, a secondary notification might inform the public of the gunman, but only after the authorities are informed of the danger. Current mass notification broadcasts through SMS and other methods do nothing to help students or individuals in immediate danger of being harmed. The definition of "first line of defense" in comparison to "second line defense" enables users to activate the nearest local emergency notification system (including one or more sirens) such as, for example, in a classroom in the school, hallway, sidewalk, dorm, assembly hall or encompassing the entire campus, community or region if warranted.

There are several "secondary line of defense" communication notification companies that specialize in broadcast or mass text messaging protocols. Mass notification text messaging companies include: Omnilert, Extreme Alert, and Codered Emergency Communication Network. These mass communication providers have systems which are viable means of communicating an emergency event to a selected group of authorized subscribers. These subscribers view the mass broadcasts through cellular and mobile device networks, personal computers, laptop computers, personal digital assistant devices and other communication devices. However, these companies do not provide actual time alert systems that will help prevent the loss of life or property when facing a gunman, terrorist, potential rape and other victims of violent crime. Current warning and alert systems do not warn others (e.g., non-subscribers) of current real-time events based on "live" situations, real-time occurrences and other situations.

In sum, there are numerous inherent disadvantages with current mass notification technologies. For example, broadcast messaging (like SMS messaging), is a passive technology. As another example, current notification systems do not allow subscribers to actively interact, interface, trigger or activate a location's alarm or siren network. And, while current notification systems allow subscribers to exchange information with the host computer through the end user's mobile device, such systems stop short of employing the mobile device as anything other than a "second line of defense" means of communication that is relayed on a mass basis. Moreover, the current state of art does not allow for the dynamic activation of deterrent sirens/alarms and triggering circumstances that could help prevent terrorism and other crimes from occurring. Additionally, the current state of the art does not allow for "actual time" forensic information to be electronically collected, stored or transferred to emergency personnel and/or other organizations in order to help prevent injury, further injury or harm. As yet another example, the current state of the art does not enable cell to cell wireless hosting, thereby enabling the triggering of cell to cell "hopping" (defined as enabling the dynamic interaction of cell phone to cell phone and or mobile device to mobile device, the enabling and triggering remote electronic devices in order to communicate, or to activate an alarm/siren with in the vicinity of the crime scene). In still another example, the current art does not enable mobile and/or cellular devices the ability to inform other users or other electronic devices of the occurrence of an emergency in real time, such as a terrorist act, bombing, robbery, murder, assault and or any illegal act or commission of a crime. Finally, current alarm systems do not enable geographic frequency, audible, or visible pulsations that inform (e.g., warn) the masses and emergency authorities of dynamic site specific "hotspots" of where the violation was committed or is being committed, thus preventing the further unnecessary loss of life and territorial crime scene endangerment by both bystanders and emergency authorities. Moreover, the current state of the art notification systems do not allow for dynamic interaction between the person in the emergency and other persons who are nearby the emergency situation. As a result, other people who are nearby the emergency situation, unknowing of the potential threat, cannot react to the "actual time" emergency situation. Current art technology does not dynamically prevent the loss of life, does not dynamically and informally execute an approximately actual time dynamic warning signal that engages a trigger that can possibly prevent the crime from occurring or getting worse.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of alarm notification. An alert mode of a mobile device is activated based on an emergency situation in an area. The mobile device transmits an indication of the emergency situation to a communication network control system. The communication network control system confirms the indication of the emergency situation to the mobile device and notifies emergency personnel of the indication of the emergency situation. The communication network control system transmits an indication of the emergency situation to one or more additional mobile devices in the area.

BRIEF DESCRIPTION OF THE DRAWINGS

The present invention may be described herein in terms of functional block components or various processing steps. It should be appreciated that such functional blocks or steps may optionally be realized by any number of hardware, firmware, and/or software components configured to perform any of the specified functions or steps. For example, the present invention's computer may employ various computing systems, including software and memory elements, digital signal processing elements, look-up tables, databases, and the like, which may carry out a variety of functions under the control of one or more microprocessors or other control devices. Further, any software or hardware optionally employed may communicate through any known network such as the Internet. Such general techniques and components that are known to those skilled in the art are not described in detail herein. It should further be understood that the exemplary process or processes illustrated may include more or less steps or may be performed in the context of a larger processing scheme. Furthermore, the various flowcharts presented in the drawing figures are not to be construed as limiting the order in which the individual process steps may be performed.

The accompanying figures further illustrate the present invention and, together with the detailed description of the preferred embodiment, assists to explain the general principles according to the present invention.

Additional aspects of the present invention will become evident upon reviewing the non-limiting embodiments

DETAILED DESCRIPTION OF THE PREFERRED EMBODIMENT

Figure 1:
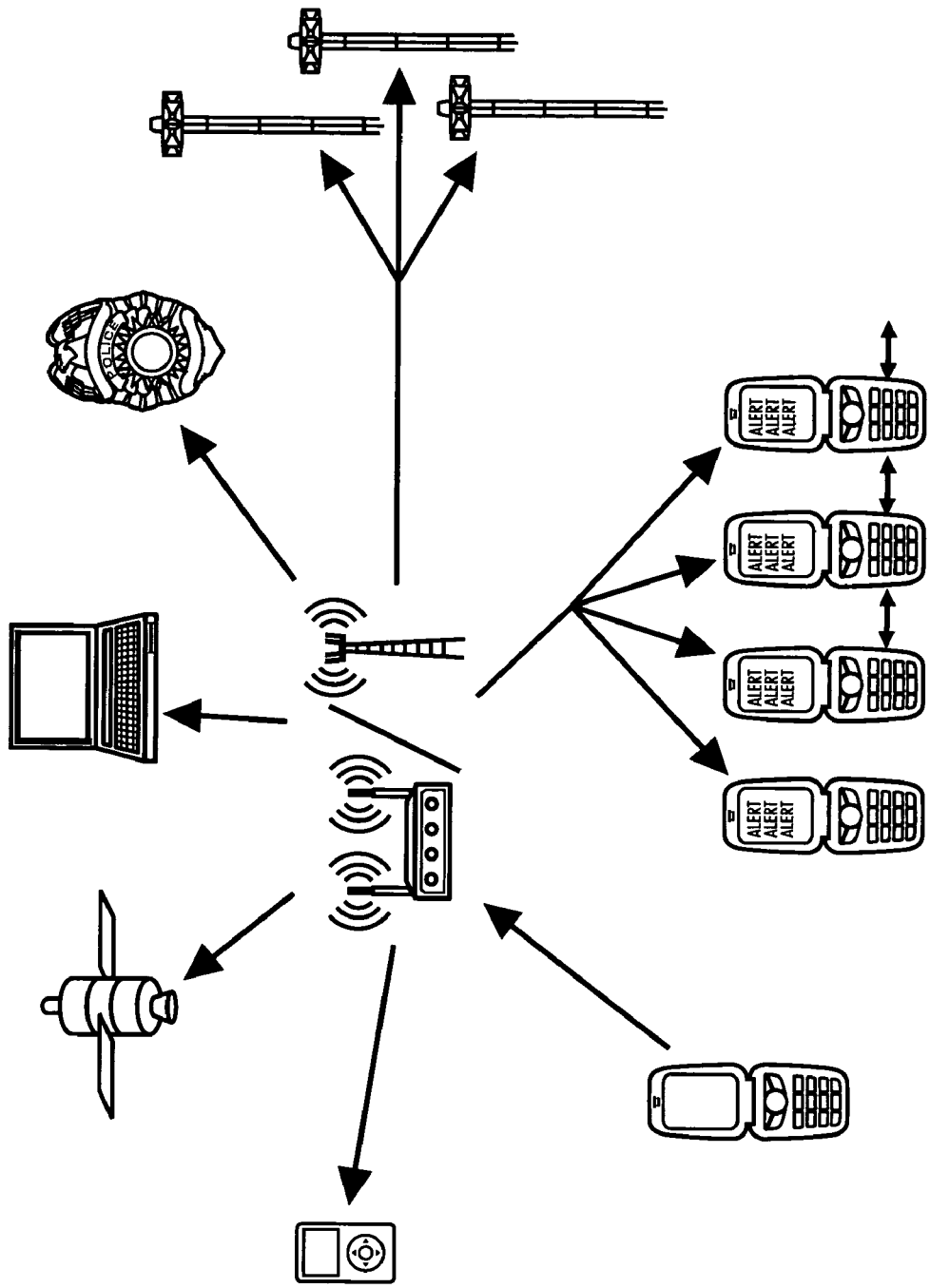
FIG. 1 is a graphic representing an overall communication stream amongst exemplary computer systems and communication devices according to one embodiment of the present invention.

The present invention is directed towards, in one embodiment, a system, process or method for controlling, operating or otherwise directing a personal safety mobile notification system, a generalized graphic illustrating the invention being show in FIG. 1. As generally seen in FIG. 1, the present invention is a process, system or method which allows a user's mobile communication device (such as, for example, a cell phone, a personal digital assistant, a pager, a computer, a laptop or like mobile device, without limitation) to be adapted to initiate an alarm notification process on the device in the event of an impending emergency or emergency in progress.

As shown in FIG. 1, when the alarm notification process is initiated on a device (such as a cell phone), the device is pre-programmed to transmit one or more alarm notification signals to a nearby wireless router or cell tower/base station, and after confirmation of the emergency event and location of the device, the present invention is then adapted to notify emergency personnel, other devices (e.g., one or more satellites) and also, notify other secondary mobile communication devices (such as, for example, other cell phones, laptops and/or PDAs). The present invention may also be adapted to notify and control audible alarms within a pre-defined vicinity of the device originating the alarm notification signal. Of course, those of skill in the art will realize that while the geographic vicinity of the emergency event may be limited to a small geographic area (e.g., ⅛ mile radius around the emergency event) or structure (a specific school building), this geographic vicinity may be expanded or contracted as desired through appropriate pre-defined programming processes.

While not shown by any element or flow chart box in the attached Figures, the present invention generally includes introducing a mobile device having a programmable computer control system, the computer control system being adapted to create and transmit an alarm notification signal over one or more of the mobile device's control channels (and thus, to a nearby cell tower/base station, or alternatively, a wireless router) upon engagement of a pre-defined alert triggering device associated with the mobile device. Those of skill in the art will realize that the alarm notification is not limited to transmission solely over a control channel, but can be adapted to be transmitted over any suitable communication signal path or paths (such as multiple frequency techniques, frequency shifting techniques, mathematical modeling techniques or time shifting techniques). Next, the receiving station (e.g., tower/base station) is adapted to transmit the alarm notification signal to the PLMN network for emergency processing, either electronically or through human intervention.

Those of skill in the art will recognize that the phrase "computer control system" within a mobile device (such as a cell phone) is not limited to a single microprocessor, but may include one or more programmable microprocessors, microcontrollers, computers, analog-to-digital and digital-to-analog conversion chips, control amplifiers and storage electronics (such as ROM, RAM, DRAM, EPROM and flash memory), and like mobile device electronics, all in communication with one another.

Figure 4:
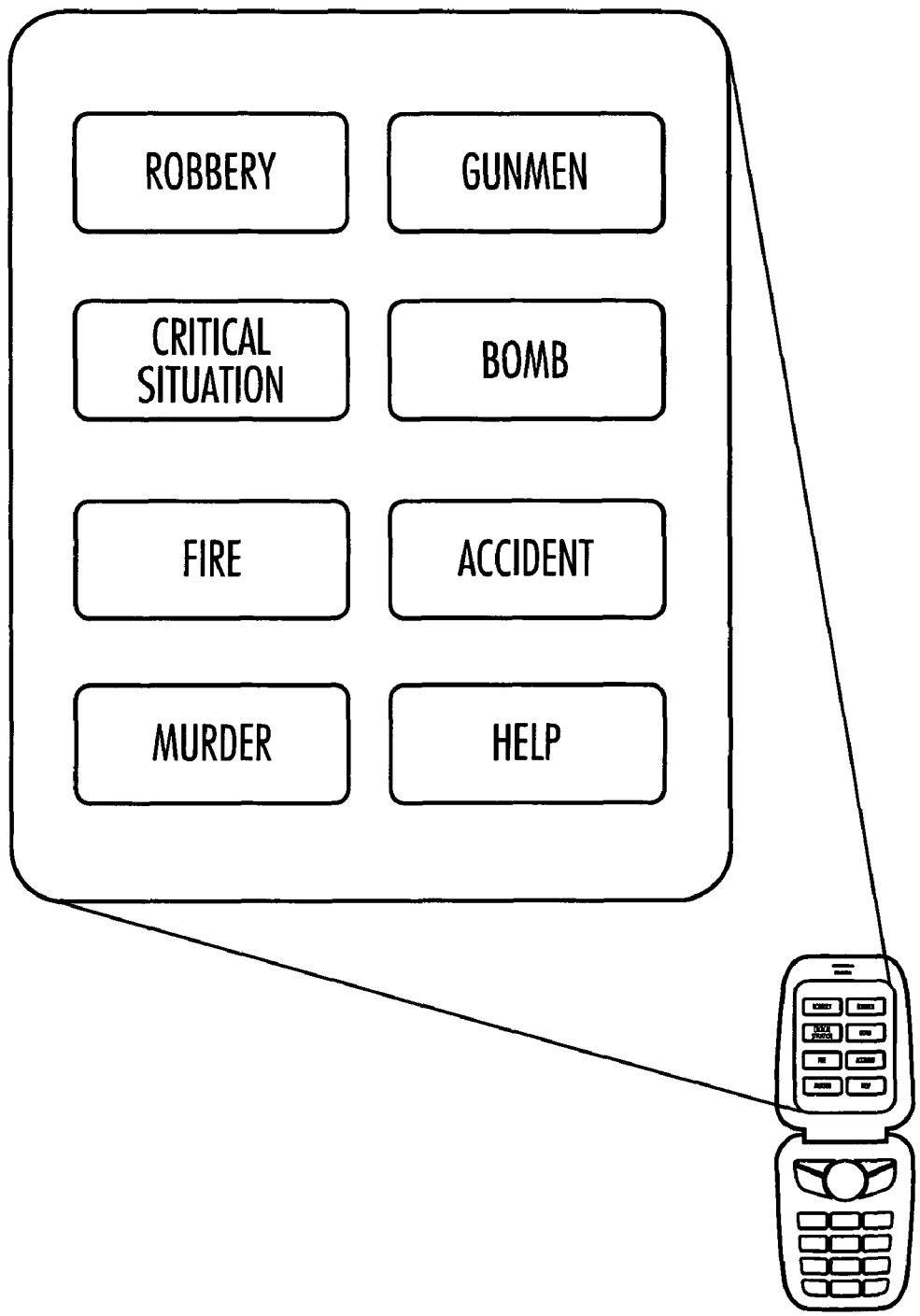
FIG. 4 is an illustration representing one or more potential alert triggers which may be implemented in a mobile communication device according to the present invention.

An exemplary alert triggering device may include defining a pre-defined key on the cellular phone's keypad as exemplified in FIG. 4 (in electronic communication with the computer control system), which, when depressed for a pre-defined time (say, three seconds, for example), initiates the mobile device's alarm notification process. Alternatively, an exemplary alert trigger may include the mobile device's receipt of a pre-defined key pattern (such, as the numbers "777", for example), which, when depressed and transmitted to the tower/base station or router, initiates the mobile device's alarm notification process. As still another embodiment, an exemplary alert trigger may include a pressure-activated button on the mobile device (in electronic communication with the mobile device's computer control system), which, when activated, initiates the mobile device's alarm notification process. In still another embodiment, the mobile device's computer control system may be adapted to initially receive and store a user's alarm voice command, and, when the user's alarm voice command is subsequently repeated by the user, the mobile device's computer control system confirms the voice command and initiates the mobile device's alarm notification process. In yet another embodiment, an alarm notification may be initiated by engaging one or more toggle switches built in to the mobile device. In yet another embodiment, an alarm notification signal may be initiated by a secondary transmission device as disclosed more fully below. Optionally, for an extreme emergency event (and one in which a user may not be able to easily use the foregoing means for initiating an alarm notification signal), a mobile device's computer control system may contain one or more inertial movement means which are adapted to create and transmit an alarm notification signal when the mobile device is thrown, violently shook or rapidly moved.

An exemplary alarm notification process may include adapting the mobile device to initially transmit a request for geographic global positioning to the tower/base station over one or more control channels, allowing either the tower/base station or the PLMN network (or, both) to calculate and identify an approximate or exact location data of the device transmitting the request, and adapting the mobile device to receive the geographic global positioning information data from the tower/base station and the network over one or more control channels (or similar signal transmission means). Of course, the network may be adapted to communicate with global positioning systems ("GPS") to obtain this location data. Those of skill in the art will recognize that while cell tower location (providing approximate or coarse location) and GPS (providing accurate location) data may be obtained by the network, a number of other techniques may be utilized by the present invention to get the mobile device's approximate or exact location, such as cell tower trilateration, Wi-Fi trilateration, digital television signal trilateration and like technologies, whether existing or developed in the future. Thus, some of these technologies will provide approximate or exact location data based on the mobile device being deep within a large building, in a tunnel or like situations. Thereafter, the mobile device may be adapted to transmit an emergency signal and the geographic global positioning information to the tower/base station over one or more control channels (or similar signal or communication transmission means). Optionally, an alarm notification process may also include the step of displaying the global positioning information on the device's display (thereby allowing a user to confirm that a GPS signal is available and was transmitted to the network along with the emergency signal). Optionally, the mobile device may be adapted to receive, create and transmit an alarm notification signal that corresponds to the type of emergency event in progress such as, for example, illustrated in FIG. 4 (such as ranging from, for example, the instance of a minor emergency such as a non-life threatening robbery attempt, a major emergency which might occur in a shooting attempt, all the way through loss of life urgent emergency). One method for implementing this option is through a touch screen on the device's display as shown in FIG. 4, but other methods are also contemplated for inclusion, without limitation, in this invention (such as, for example, the engagement of one or more situational warning means on the device).

Figure 2:
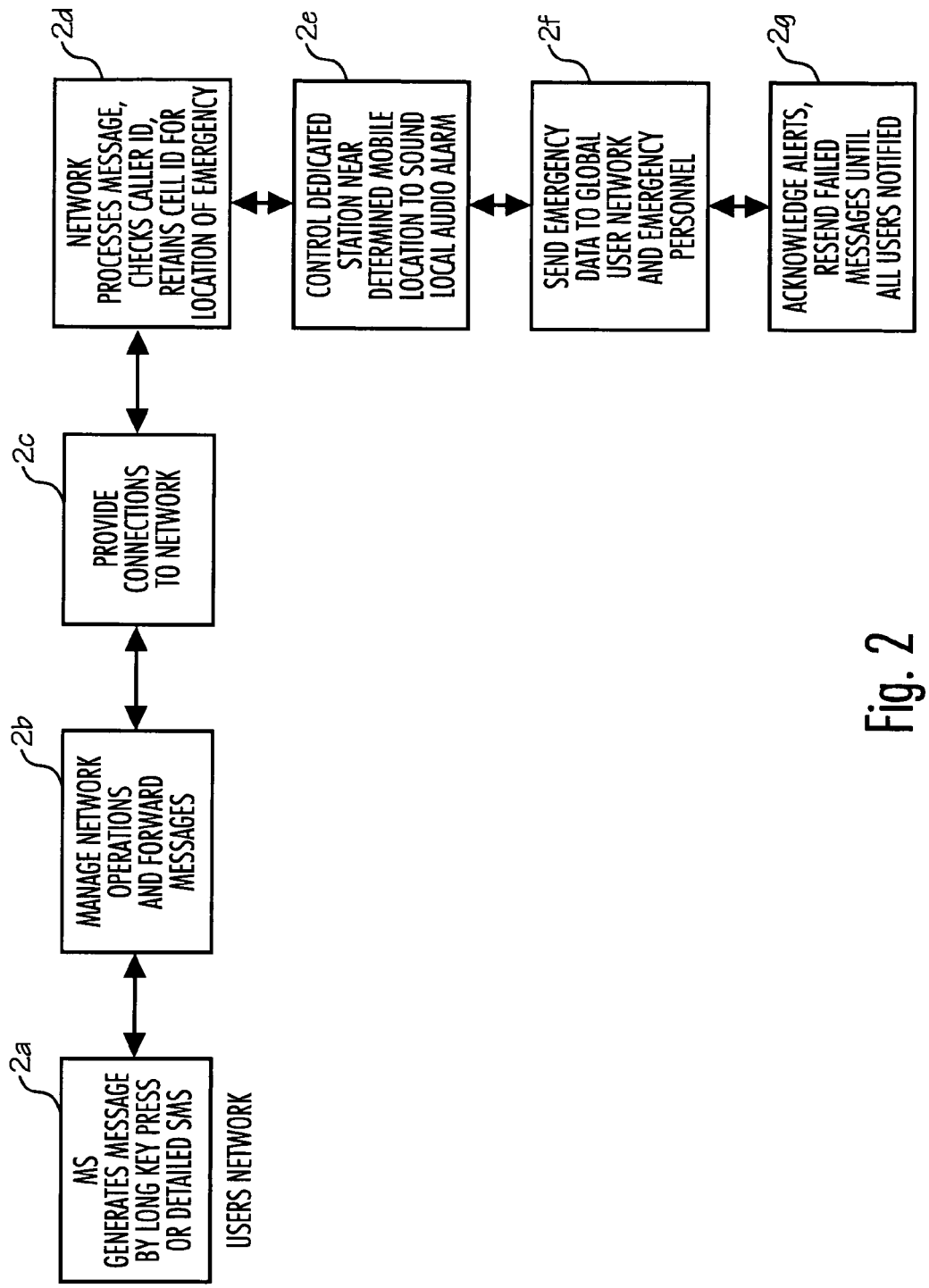
FIG. 2 is a general process flow chart illustrating one embodiment of the present invention.
Figure 5:
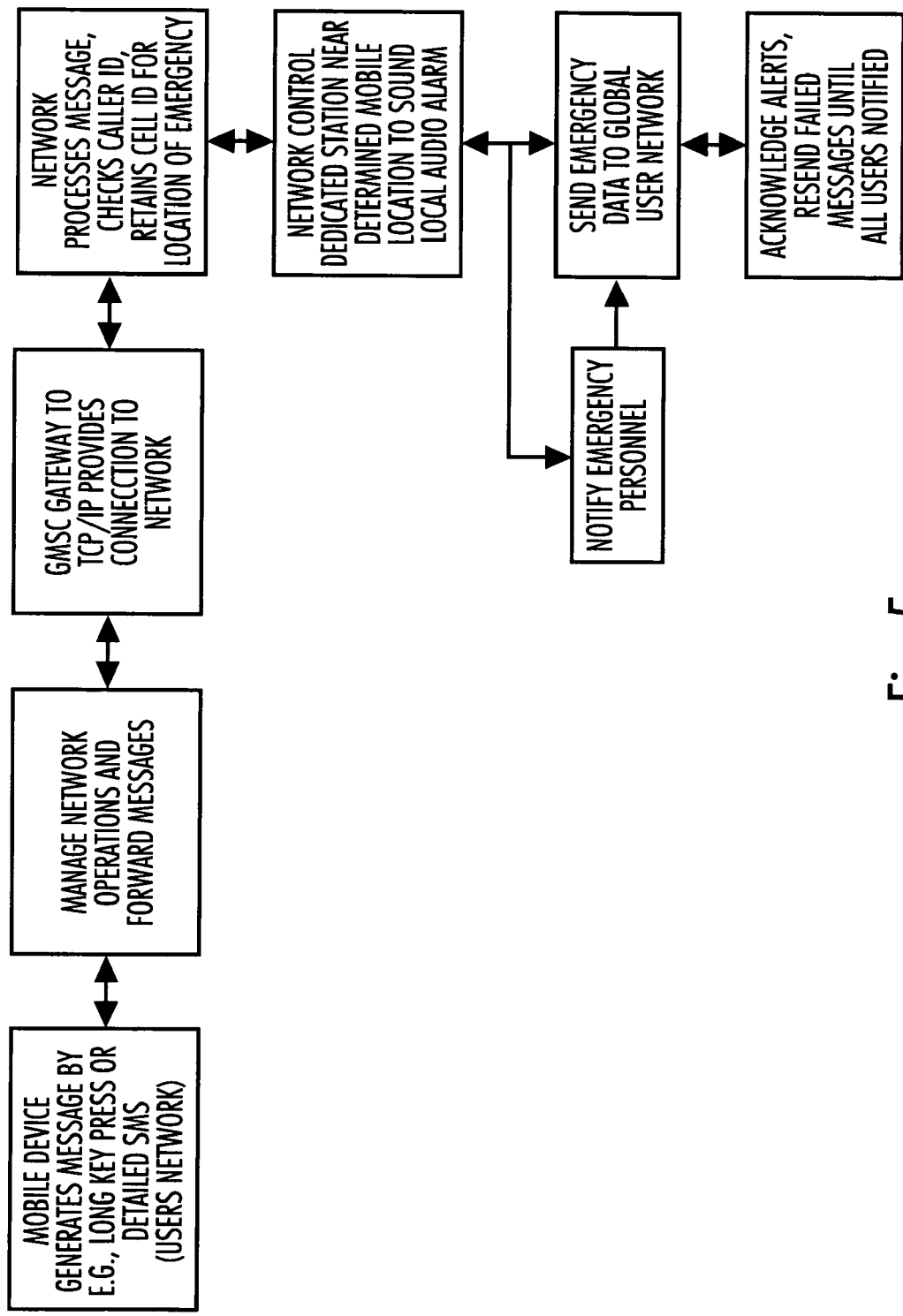
FIG. 5 is a general process flow chart based upon FIG. 2 which provides additional detail of another embodiment of the present invention.

A general process flow chart of one embodiment of the present invention is shown in FIGS. 2 and 5. As seen by the steps in these figures, a mobile electronic device is adapted to receive a command from a user which corresponds to an emergency event (e.g., step 2a). Upon receipt, the mobile electronic device is adapted to create and transmit an alarm notification signal over the mobile device's control channel or one or more transmission communication signals (and thus, employing a nearby cell tower/base station, or alternatively, a wireless router to receive the alarm notification signal) upon engagement of a pre-defined alert triggering device associated with the mobile device (e.g., steps 2b-2c). Next, the base station or router of the present invention is adapted to transmit the alarm notification signal to the PLMN computer and communication system (e.g., steps 2d-2g) for emergency processing, either electronically or through human intervention. Of course, the transmission of the alarm notification signal may be electronically processed by any conventional software used by the tower/base station and PLMN network such as the MSC/SMSC and the GMSC gateway to TCP/IP protocols as generally illustrated in FIG. 5.

As seen in FIG. 2, step 2d and FIG. 5, the PLMN electronic and communication system is preferably adapted to process the alarm notification signal for emergency processing under a number of optional approaches. For example, if the alarm notification signal is comprised of a text message, the PLMN electronic and communication system may be adapted to process the text message, calculate and store the geographic location and identification number (e.g., cell phone number) of the mobile device, and transmit this data back to the mobile device which initiated the alarm notification signal (thereby providing assurance to the user that the alarm notification signal was received by the carrier's PLMN electronic and communication system).

Optionally (and not identified in the figures), the PLMN electronic and communication system may further be adapted to transmit, at pre-defined intervals, follow-up emergency data to the mobile device which initiated the alarm notification signal, thereby providing updated information to the person in the emergency concerning the emergency event (such as, for example, identifying which emergency personnel was contacted regarding the emergency event, the emergency personnel's location relative to the mobile device location, and any other data related to the emergency event). During any one of the optional process steps, the PLMN network should be adapted to receive, prioritize and/or process any signals or data coming from the mobile device after the emergency notification signal is received (which the user may transmit, such as to notify emergency authorities that a gunman is mobile and moving in a specified direction, or that the emergency event is intensifying).

At approximately the same time (as illustrated in FIG. 5), the PLMN's network may then be adapted to notify emergency personnel (e.g., police, fire, SWAT, military, etc.) data which corresponds to the nature of the emergency event if such information is included with the alarm notification signal as disclosed previously. Preferably, through networking or otherwise communicating with other towers/base stations, computers and/or satellite systems (whether by wired or wireless communications), the present invention may be adapted to calculate and locate the approximate or exact location of the mobile device initiating the alarm notification signal, and transmit such location information to the emergency authorities. Thus, in one embodiment, the present invention will allow a PLMN network to generate or receive a global positioning system (GPS) signal identifying the approximate or exact location of the mobile device for transmission to the authorities. As part of this GPS process step, the present invention may also be adapted to allow the PLMN network to transmit best or optimized route data regarding the pending emergency to the emergency personnel, wherein such data provides instructions to emergency personnel of either the most direct directional route to the emergency, and/or, provides an optimized directional route to the emergency location based on known current traffic data (thereby, allowing the emergency personnel to avoid congested traffic routes, for example). As the route is mapped out by the PLMN network based on GPS data, the PLMN network may also be adapted to control and change all traffic lights, signage and pedestrian walks (generally referred to as "traffic control signals") appearing along the selected route to allow emergency vehicles a more immediate travel path to the emergency area. This will insure the safety of the general public along the defined GPS route as well as creating an optimized path to the mobile phone which initiated the emergency.

Alternatively, the PLMN's electronic and communication system may then be adapted to identify and control localized alarm systems (whether existing or which may later be implemented) in the geographic vicinity of the mobile device which initiated the alarm notification signal, to thereby set off or engage the localized alarm system. In this fashion, an audible, visible or silent siren from a localized alarm system may be enough to stop the emergency event in that a potential attacker will be scared off from committing any further crime. Moreover, this approach will likely alert persons in the nearby area that an emergency event is currently in progress in the vicinity, to thereby allow such persons to take actions to avoid the emergency event. A "silent alarm", in one embodiment, may include an alarm which, instead of transmitting either an audible or visual signal in the event of an alarm notification signal, will transmit a signal to other secondary mobile devices with a command, for example, to vibrate in the event of an emergency. As such, such an implementation is "silent" as to audible or visual warnings, but effective to notify a user of potential danger.

In still another embodiment, the PLMN's electronic and communication system may then be adapted to identify all known secondary mobile devices in the geographic vicinity of the mobile device which initiated the alarm notification, and attempt to transmit an emergency signal or message to each secondary mobile device in the vicinity, thereby alerting such devices that an emergency event is currently in progress in the vicinity. Of course, such a transmission could be as simple as commanding each secondary mobile device to ring with a pre-selected ring tone. Optionally, such a transmission could be to transmit a general text message to the secondary mobile devices, the text message containing information relating to the emergency (such as the location of the emergency, the nature of the emergency, and/or the confirmation that local authorities have been contacted regarding the emergency). In still another embodiment, the present invention, using GPS data in relation to the mobile device, may be adapted for the network to transmit exit information data to all mobile devices in the vicinity of the emergency event, the exit information data providing each user one or more optimized directional data which would allow a user to move away from the emergency location, or for example, to provide each user with the nearest exit within a structure.

The phrase "first line of defense" as disclosed in this invention is also defined to mean the implementation of the present invention to enable any device to actively allow an individual to trigger a network's emergency system (such as a siren) when facing actual danger in any environment, in any location, with any mobile device, from any and all wireless and wire LAN networks, through any frequency or any communication protocol. This definition also includes enablement of any mobile device to contact nearby secondary mobile devices for notification of the threatened, or in-progress, emergency.

Figure 3:
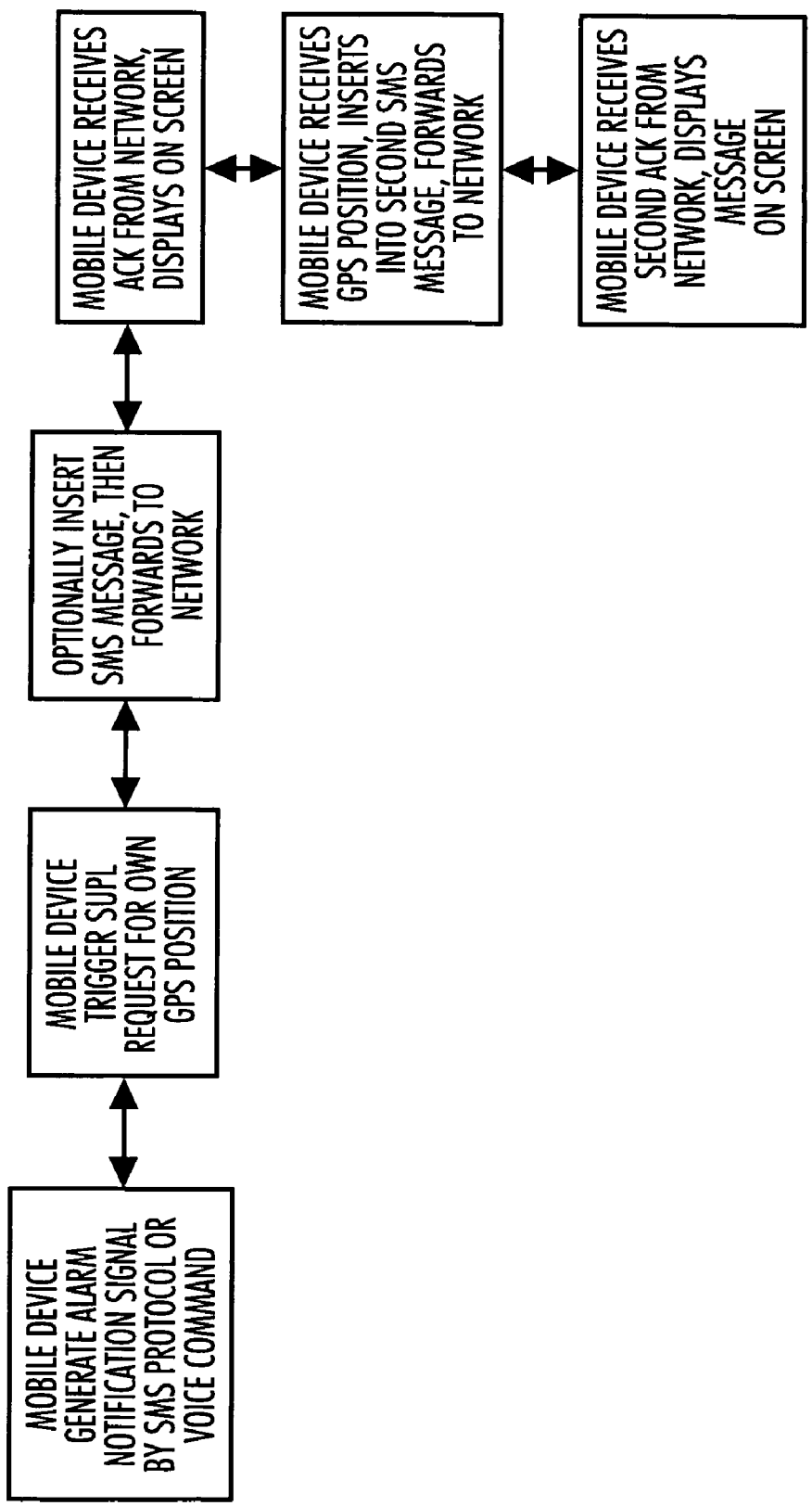
FIG. 3 is a general process flow chart illustrating another embodiment of the present invention, the flow chart depicting the present invention's technology as it may be implemented with existing technology.

As another embodiment as generally illustrated in FIG. 3, an alarm notification process may also include adapting the mobile device to create, store and transmit a pre-determined text message through the SMS protocol which, upon engagement of the alert triggering device, is electronically transmitted to the tower/base station or network along with the emergency signal and/or the geographic global positioning information. Clearly, the use of the SMS protocol in this embodiment may be a useful form of transmitting the text message. In still another embodiment as generally shown in FIG. 3, an alarm notification process may also include adapting the invention to, upon purchase or lease of the mobile device, allow the user to create and store a user's pre-determined text message or voice command corresponding to an alert message only known to the user, which, upon transmission the user's pre-determined text message, the mobile device of the present invention is adapted to recognize the user's pre-determined text message or voice command as a form of emergency notification, and the system thereafter processes the user's pre-determined text message or voice command as an emergency event to automatically initiate an alarm notification signal to the network.

In still another embodiment of the present invention, each mobile device could be adapted to include a bypass (or, backup) battery in communication with the computer control system, the backup battery being activated by the computer control system to power the device if, within a certain time after the alarm notification signal is transmitted by the device, the device's main power source either fails or is turned off (for example, if a gunman found the phone, and proceeded to turn the device's main power source off). In this optional embodiment, the device's backup battery will still be able to allow the mobile device to silently transmit GPS location (or, emergency information) to nearby towers/base stations, so that emergency personnel will be able to track the movement of the device (even if it appears that the device is powered off or otherwise not functional).

In one embodiment, the present invention's steps can be programmed in to the computer control system of new mobile devices. However, the present invention contemplates that this technology may also be implemented in existing mobile devices. The process of modifying existing mobile devices to the present invention can start with re-programming of existing mobile device computer control systems. Thus, for example, existing mobile devices may be re-programmed (or upgraded) when an existing mobile device is turned on or first activated. In this approach, when the device attempts to transmit a signal seeking the nearest cellular tower or router, the tower/base station and the PLMN computer system may be adapted to recognize that the mobile device is a legacy product (e.g., it does not have updated software), and the PLMN computer system will proceed to re-transmit updated programming code to implement the present invention on the legacy device. This approach, however, may require manufacturing expertise, and in some cases, a user may have to send the phone to a local service center for re-programming (due to, for example, the dated electronics in the device), at a cost of inconvenience to the user. As such, alternatively, a mobile device's SIM card could easily be programmed at a local mobile device store to re-program the mobile device's computer control system upon insertion of the SIM card in to an operating mobile device.

In like fashion, an optional embodiment of the present invention may include adapting existing or new computer control systems to include a new form of operation of the mobile device which corresponds visually with the current mobile device selections of "loud ringtone", "soft ringtone", "vibrate mode" and "silent mode". However, in this "alert mode" embodiment, the computer control system could be adapted to display an "alert mode" (or like designation), so that when a mobile device includes an alert mode, the device is programmed to disable all unnecessary features of the mobile device except those features which are required to implement the present invention. Thus, preferably in this embodiment, when a mobile device is set to an "alert mode", the device will appear as though it is off, but functionally, the device will continue to communicate with the network and all of its features, and maintain the ability to either transmit an alarm notification signal, or receive emergency data from the network and/or other nearby mobile devices. These processes and/or upgrades will not change or alter the existing functions or functionality of the mobile device.

In yet another embodiment of the present invention, the present invention's steps can be adapted for physical or olfactory notification rather than audible or visual. This implementation would be useful for those persons who are visually impaired. In this implementation, devices may be adapted to physically vibrate in accordance with known vibration modes used for the visually impaired (such as Morse code, for example), so that while the phone is quiet, it may be adapted to vibrate text messages to the user who is visually impaired concerning the alarm notification process of the present invention. In like fashion, the present invention may have the mobile device fitted with an olfactory means in communication with the compute control system, so that upon either the event of an alarm notification signal or upon receiving a command from the PLMN network or another secondary mobile device, the olfactory means generates a pre-defined scent corresponding to the emergency event, thereby notifying the user of possible danger.

An exemplary mobile device should have the capability to connect to a wireless network by any wireless network or wireless protocol. Additionally, such a mobile device would preferably be equipped with standard GPS capabilities so that the mobile device's signal can be tracked to the original source of the emergency alert, location or mobile device. As used herein, the term "network" refers to any electronic interconnection between two or more electronic devices over which data is transferred, including, but not limited to, the Internet, an intranet, a land line or traditional telephone network, a cellular or wireless mobile network, a wireless microwave network, television or radio wave transmissions, a cable network, a wireless connection (for example, infrared or microwave connections), satellite, a localized land network system, induction connection using electric lines, a wireless network using lasers as the transmitting medium, any combination of any of the preceding or any other system for the transmission of data between two or more units. A "secure network" is a network employing security measures against unauthorized access to data being transmitted via the network or data stored within a memory storage area of a device connected to the secure network. And, the term "facility" may refer to a multi-story building; a single level building and a site built custom designed building that is location specific as to marketing needs and site ramifications.

Modifications to the PLMN's computer system or network are likely, in-order to implement one or more functions or steps of the present invention. The PLMN network should be constructed to support any wireless systems, RFID or similar technology. The PLMN network should be adapted to communicate directly with emergency personnel systems employed by local authorities (e.g., police, fire, ambulance, emergency medical personnel, an organization's security department, or any combination of the foregoing). Preferably, the PLMN network would also be adapted to communicate and share data with secondary PLMN networks owned by other carriers, so that each PLMN network is adapted to notify mobile devices near the emergency of the emergency. After the emergency notification has been activated, the PLMN network would be adapted to transmit an alert through its network to all mobile devices communicating with this network. Again, along with the other notifications, the carrier's PLMN network would send a signal to the nearest audible alert siren, making immediate public awareness of an emergency. In still another embodiment, if one or more structures in the vicinity of the emergency event are properly equipped with controllable olfactory systems, the present invention may be adapted for the network to selectively engage each olfactory system to generate scents which correspond to the location or severity of the emergency event. Thus, in one example of this embodiment, the present invention may control an olfactory system to dispense a pleasant smell for locations remote from the emergency event, and to dispense increasingly offensive scents from olfactory systems which are closer to the emergency event.

It is contemplated that the present invention may also be optionally adapted to geographically suit the needs of specialized buildings, such as school campus buildings, office buildings, community buildings, entertainment arenas or any public area structures (including airports, government or private organizations, private residence or neighborhood buildings).

Figure 7:
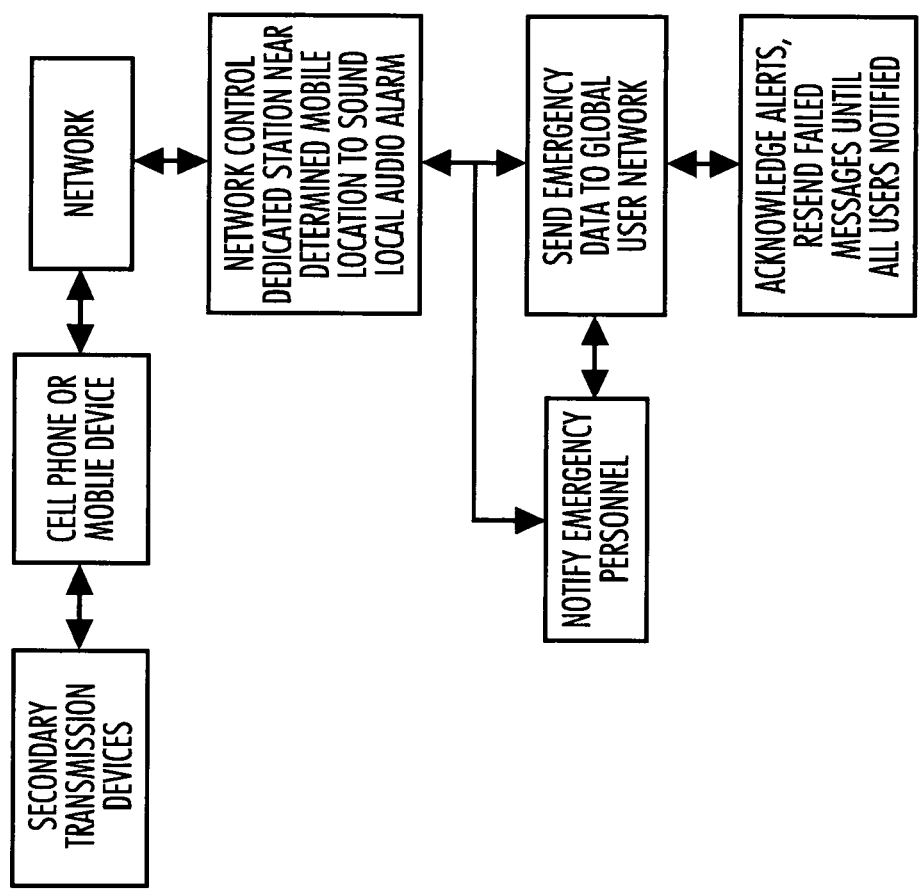
FIG. 7 is a general process flow chart illustrating another embodiment of the present invention.
Figure 8:
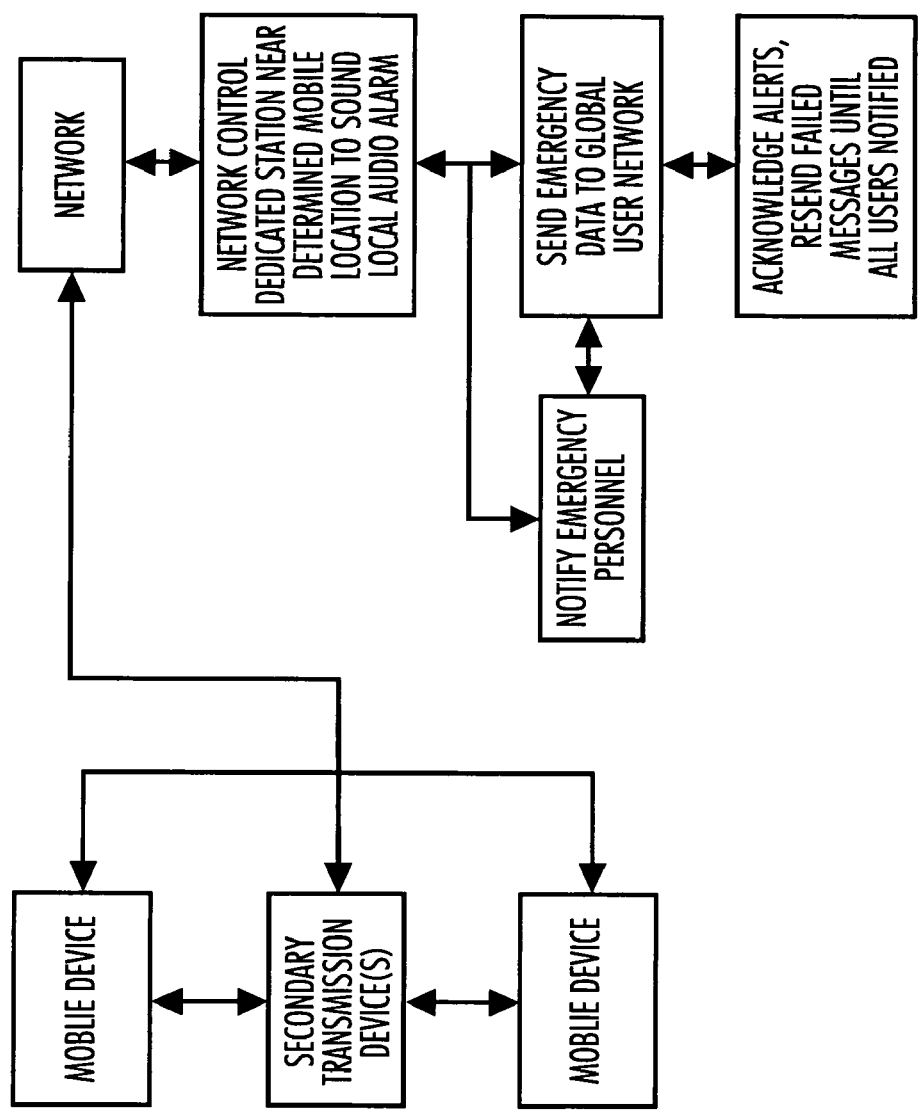
FIG. 8 is a general process flow chart illustrating another embodiment of the present invention.

As another embodiment to the present invention as generally illustrated in FIGS. 7 and 8, the system can also be set up to initiate the alarm notification process through use of a secondary transmission device in communication with the mobile device, the PLMN network, a localized Wi-Fi, Wi-Max or any other wireless protocol connected to the Internet through a router. Thus, for example, an item of clothing (such as a jacket), clothing accessories (such as a wristband) or some other type of article which can be worn by a user or is in nearby reach, may be adapted to include secondary electronics which are adapted to communicate with a nearby mobile device (such as a cell phone located in the user's purse or belt holster, for example) in order to instruct the mobile device to initiate an alarm notification signal due to an emergency event. Representative secondary transmission devices may also include, without limitation, jewelry, earrings, watches, finger rings, wireless earphones, key rings, key chains, keys, wallets, belts, belt buckles, shoes, shirts, caps, backpacks, or any other secondary transmission device which may be coupled to, integrated with, hooked or tethered to any of the foregoing. Such secondary transmission devices can also be given to a non-mobile device user, so that upon activation, the secondary transmission device will search, locate and communicate with the nearest mobile device (e.g., cell phone) or other nearby secondary transmission device in order to engage the alarm notification process. The process, as disclosed herein, would notify the proper authorities along with the general public in the immediate area of the situation.

Those of skill in the art will now realize that any number of communication protocols may be employed to realize the present invention, including voice transmission, voice synthesizer transmission, audio transmission, audio-visual transmission, radio frequency transmission, electronic signal transmission, touch screen; and further, through any current or future wireless protocol, such as, for example, cellular, microwave, IEEE 802.11x, Bluetooth, Wi-Fi, Wi-Max and satellite; and further, through any wirelan protocol, such as a telephone, a handheld device, an onsite or offsite communication device, a point device, a touch device, a personal computer, or through a combination of hard-wirelan and wireless networks such as may be found on the Internet, or any current or future communication protocol, or any combination of the foregoing.

The present invention also contemplates the PLMN computer system to directly contact the device initiating the alarm notification signal by, for example, placing a call directly to the mobile phone and local police or emergency personnel, thereby allowing the user of the phone to directly communicate with emergency personnel. If the call fails, the present invention is adapted to control the PLMN computer system to transmit a text message to the mobile device. If this communication fails as well, the present invention may implement other communication approaches until the recipient is contacted or runs out of options.

Figure 6:
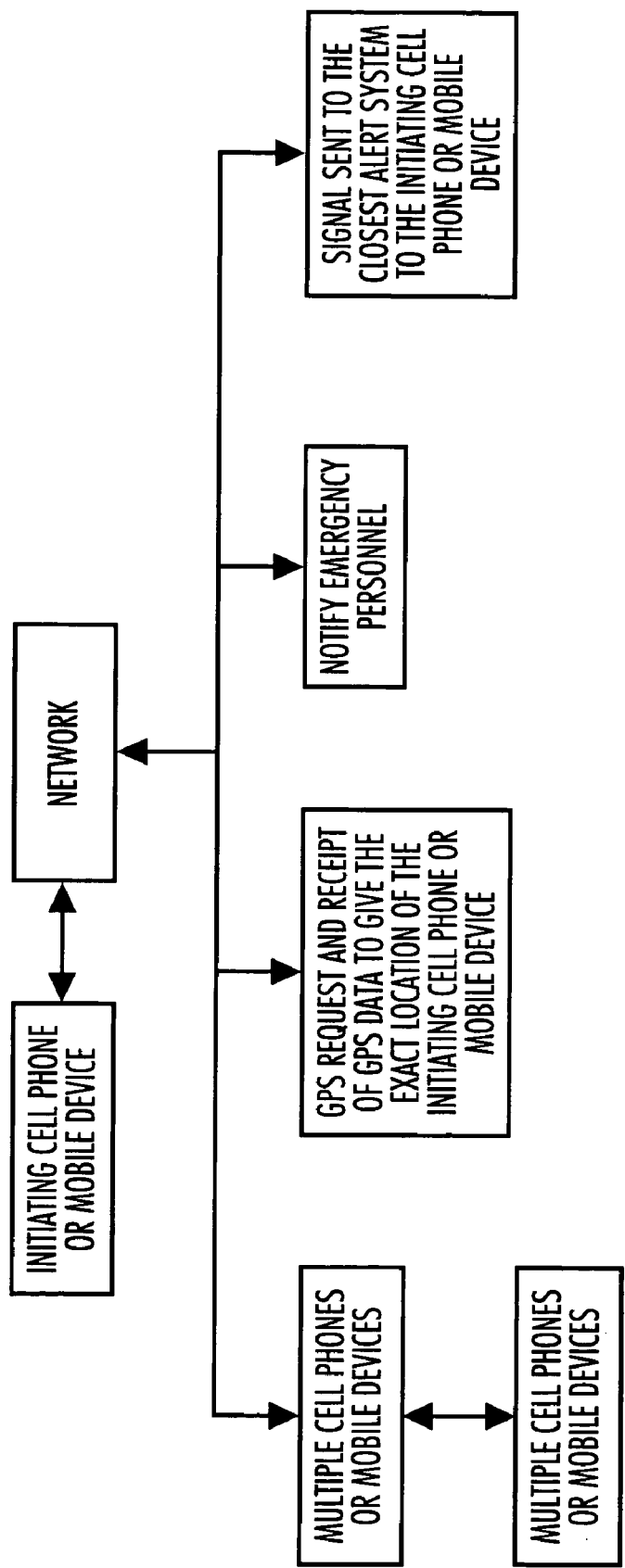
FIG. 6 is a general process flow chart illustrating another embodiment of the present invention.

As seen in FIG. 6, the present invention may be adapted to perform several steps either concurrently or in approximately real time. For example, in the event of an emergency, the individual that is in harms way would activate an alarm notification signal on the mobile device. Upon the PLMN computer system receiving the alarm notification signal, the PLMN computer system will then automatically determine the location of the mobile device through GPS positioning techniques. The PLMN network could then perform approximately simultaneous tasks. First, the PLMN network would be adapted to transmit an emergency alert to all mobile devices within a pre-defined vicinity of the mobile device initiating the alert. In one embodiment, this emergency alert could be adapted to emit a series of beeps whether the mobile device was turned on or off, making the users aware of a potentially dangerous situation. Next, the PLMN network could alert the proper authorities of the danger at hand. Next, the PLMN network could be adapted to control and activate a siren within the closest proximity to the originating mobile device, warning those individuals nearest to the pending danger. If several sirens are in the vicinity, the present invention is adapted to control the sirens as a means of notifying persons the proximity of the emergency (e.g., the sirens emitting short frequency audible sounds if the danger is nearby, the sirens emitting longer frequency audible sounds if the danger is more remote). In this fashion, persons may then be able to determine the proximity of danger due to the siren's audible signaling, thereby allowing such persons to take appropriate actions to avoid the dangerous area. Stated differently, the emergency audible siren could vary in scope and range (frequency/audible pulsations, or visual pulsations if available) in direct proportion to the danger area and emergency. Additionally, this approach allows the territorialization and localization from a small area emergency to an entire region if warranted by the emergency event, trigger and or scope of danger.

In still another embodiment of the present invention, the network may be adapted to control an emergency audible or visual system which could vary in frequency and pulsation in order to help direct any ensuing crowd control and emergency organizations either hearing or seeing the audible or visual system. In addition, the variance and frequency pulsations could, in yet another embodiment, direct emergency authorities to the "hotspot" of the emergency. "Hotspot", could be defined as the most likely area of the crime and or dangerous event, the pursuing manhunt, locating potential victims, the injured, etc. The pulsating frequencies and or decibels could be symbolically analogous to a "Geiger Counter Type" pulsation that could, in yet another embodiment of this invention, increase or decrease as warranted by the crime scene in order to create a directional variance alert system for the public and emergency authorities. In addition, any and all sensory directional variance alert systems could be used with the present invention, including but not limited to, visual frequency variance in conjunction or independently with audible and or all other distinctive frequency variables including but not limited to the spoken word, olfactory, touch, mobile alert device vibrations and a combination of all.

As seen in FIGS. 1, 6 and 8, the present invention also contemplates what is herein defined as "cell hopping" technology. As disclosed above, as one embodiment of the present invention, when an alarm notification process is implemented in accordance with one aspect of the present invention, mobile devices in the vicinity are notified of the near-by alarm event through the PLMN network. However, in some instances, certain mobile devices either cannot or will not accept such notification. In these instances, the present invention contemplates adapting the secondary mobile devices to transmit an alarm event notification to all mobile devices within a nearby pre-defined area. In this regard, even if a particular mobile device cannot or will not accept the alarm event notification from a PLMN network, the alarm event notification may be received by the particular mobile device from another near-by mobile device. This process step creates a device to device network. This device to device network, in this embodiment, may have a plurality of functions that include, but are not limited to, the activation or triggering of the individual's mobile alert device alarm/siren, the activation of the general facility or landscape alarm/siren, the transmission of information to law enforcement and security agents and additional functions. The activated audible mobile alert device alarm/siren in yet another embodiment is unlimited in the number of device to device audible signals that can be triggered. The number and frequency of this horizontal triggering mechanism is dependent upon the reach and number of mobile alert device devices in the crime scene or emergency event. In addition, the reach is dependent upon the wireless protocol used to trigger other devices in case of emergency.

The present invention is also adapted to allow for the recording, collection or otherwise storage of evidentiary data regarding the emergency event (including the identification, landscape, current situational analysis of the crime scene, and other evidentiary information). In this embodiment, each mobile device may be adapted to record, collect or store evidentiary data regarding any emergency event. Preferably, such recording, collection and storage of evidentiary data begins concurrently upon the transmittal of an alarm notification signal from a mobile device or a secondary transmission device. Of course, this embodiment relies on the mobile device's capability to record emergency events through the device's recording and storage electronics (typically found as part of the mobile device's electronic control circuitry). The mobile device will thereafter be able to store the evidentiary data in its memory, and optionally transmit such evidentiary data to the PLMN network (and thus, to emergency personnel) at approximately the same time the event is occurring and for storage on the network. In this regard, the present invention may be adapted to encapsulate evidentiary data or data events as a process, method or apparatus (called "evidentiary encapsulators") which emergency authorities may review in approximately real-time as they are on-route to the emergency location, or, which a court may later review as extrinsic evidence concerning the emergency (such as, for example., to allow a witness to recall the events, provide the court with present sense impressions, provide the court with past recollection recordings, or provide the court with any excite utterances made during the event). In some circumstances, the recorded evidence encapsulator data disclosed herein may qualify as a carrier's business record, and thus, data which withstands any evidentiary or hearsay challenges in court. Thus, such evidentiary encapsulators may include any data (audio/visual) captured and stored which can be digitally streamed to the PLMN network or a nearby router regarding the crime scene or the emergency. The evidentiary encapsulator data may include (but is not limited to) biometric identifiers, digital thermal identification, digital imaging, audible recordings and any other data which represents the crime scene or emergency event that will help the police and other emergency agencies to map the crime territory in order to best manage the emergency. Those of skill in the art will realize that another benefit of this embodiment is that such encapsulators may help identify qualitative and quantitative data gathered at the crime scene for later evidentiary use in positive identification, subsequent arrest of the alleged perpetrator and conviction.

In yet another embodiment of this invention, "encapsulators" could be defined as a "on the scene evidence gathering device" capable of "mapping the crime scene" through a plurality of digital identifiers as previously described. "encapsulators" could additionally be defined as a Cellular Based Critical Information Dispatch System, that could interface various communication networks, dispatch and computer terminals, and cellular and wireless devices and or networks.

Those of skill in the art will now realize that the recording, collection or storage of evidentiary encapsulator data process described above may also be implemented with all other embodiments disclosed in this invention. As such, the evidentiary encapsulator process may be implemented or integrated with, in one embodiment, the present invention is adapted to allow each mobile device engaging the evidentiary encapsulator process and recording data to transmit such data to all secondary mobile devices within a nearby pre-defined area (e.g., within the vicinity of the mobile device, for example).

In yet another embodiment of the current invention, several methods could be used to activate the mobile alert device. In one embodiment a directional pad or its equivalent could be used to not only set off (trigger) the locale's alarm/siren but quickly provide useful information regarding the crime scene. The directional pad is defined as any type of keyboard application, switch, mouse, voice activation and recognition software and or any type of electronic pad device used by any mobile or cellular phone or any electronic device. The information transferred by this mobile alert device directional pad is designed to quickly inform the proper authorities and or emergency personnel of the event, in addition to the enabling of the siren/alarm. The information can vary from very simplistic to complicated data such as "encapsulation" data and any and all data regarding the actual-time emergency.

One of the primary embodiments of the current invention is the fact that the PTA technology can be utilized on any locale, structure and placement or in any combinations of all territories and regions. In addition the PTA system is limitless in its reach, mobile alert device population and square footage (scope) and could be used for a broad number of applications in addition to emergency, crime or crisis situations.

As will be appreciated by one of ordinary skill in the art, the present invention may be implemented as a method, a process, a data processing system, a software system, a firmware system, a hardware system, and/or a computer program product or a combination thereof. Accordingly, the present invention may take the form of an entirely software embodiment, an entirely hardware embodiment, or an embodiment combining aspects of both software and hardware. Additionally, in the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Finally, there will likely be situations when an alarm notification signal is accidently transmitted from the mobile device to the network (for whatever reason). In these situations, it is contemplated that the present invention may be optionally adapted to verify the veracity of the alarm notification signal, and implement an emergency override process to cease operation of the present personal safety mobile notification system if the alarm notification signal is found to be false.

The foregoing description of the preferred embodiments of the invention has been presented for the purposes of illustration and description. Other variations and modifications of the present invention will be apparent to those of ordinary skill in the art, and is not limited except by the appended claims. The particular values and configurations discussed above can be varied, and are cited to illustrate particular embodiments of the present invention. As such, for example, any of the communication methods disclosed (whether as a reception or a transmission) may be implemented through either encrypted or secure modes. It is contemplated that the use of the present invention can involve components having different characteristics as long as the principles disclosed herein are followed.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, system, method, article, or apparatus that comprises a list of elements does not include only those elements but may include other elements not expressly listed or inherent to such process, system, method, article, or apparatus. Further, no element described herein is required for the practice of the invention unless expressly described as "essential" or "critical".

Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention. It is contemplated that the use of the present invention can involve components having different characteristics as long as the principle is followed.

The invention claimed is:

1. A method of alarm notification, the method comprising:
    activating an alert mode of a mobile device based on an emergency situation in an area;
    transmitting, from the mobile device, an indication of the emergency situation to a communication network control system;
    confirming, by the communication network control system, the indication of the emergency situation to the mobile device;
    notifying, by the communication network control system, emergency personnel of the indication of the emergency situation;
    transmitting, by the communication network control system, an indication of the emergency situation to one or more additional mobile devices in the area, wherein the one or more additional mobile devices are mobile devices within a predetermined physical range of the emergency situation indicated by the first mobile device; and
    transmitting, by the communication network control system, an indication of the emergency situation to one or more local alarm devices in the area, the local alarm devices being in the vicinity of the emergency situation.

2. The invention of claim 1, wherein the alert mode comprises:
    activating a backup power supply to power the mobile device;
    deactivating one or more output devices of the mobile device such that the mobile device appears to be in a powered off state, wherein the one or more output devices include a screen, a ringer, a status light, and a keypad backlight; and
    transmitting, from the mobile device, periodic update indications of the emergency situation.

3. The invention of claim 1, further comprising:
    transmitting, by the communication network control system, periodic update indications of the emergency situation to the one or more additional mobile devices.

4. The invention of claim 1, wherein the alert mode is activated by at least one of: a predefined voice command, a key press of a predefined duration, a predefined key press pattern, and an inertial movement of a predefined strength, and a secondary transmission.

5. The invention of claim 4, wherein the secondary transmission comprises:
    activating an alert mode of a secondary transmission device; and
    transmitting, by the secondary transmission device, an activation signal to the mobile device, wherein the activation signal activates the alert mode of the mobile device.

6. The invention of claim 5, wherein the secondary transmission device comprises one of: jewelry, earrings, watches, finger rings, wireless earphones, key rings, key chains, keys, wallets, belts, belt buckles, shoes, shirts, caps, and backpacks.

7. The invention of claim 1, wherein, when the alert mode is activated, the method further comprises recording of information related to the emergency situation.

8. The invention of claim 7, wherein the recording of information related to the emergency situation comprises recording at least one of audio information, video information, and location information.

9. The invention of claim 7, wherein the recording of information related to the emergency situation further comprises transmitting to, and recording by, the information to communication network control system.

10. The invention of claim 1, wherein, when the alert mode is activated, the method further comprises:
receiving, by the communication network control system, an acknowledgement for reception of the indication of the emergency situation from a corresponding one or more additional mobile devices in the area.

11. The invention of claim 10, wherein, when the alert mode is activated, the method repeatedly transmits the indication of the emergency situation to one or more additional mobile devices in the area until reception of the acknowledgement from the corresponding additional mobile device.

12. The invention of claim 1, wherein the indication of the emergency situation comprises:
location data corresponding to the location of the emergency situation, and
emergency description data corresponding to the type of the emergency situation.

13. An apparatus for alarm notification, the apparatus comprising:
a mobile device having an alert mode that is activated based on an emergency situation in an area, the mobile device is adapted to transmit an indication of the emergency situation to a communication network control system,
wherein the communication network control system: (i) confirms the indication of the emergency situation to the mobile device, (ii) notifies emergency personnel of the indication of the emergency situation, (iii) transmits an indication of the emergency situation to one or more additional mobile devices in the area, (iv) transmits periodic update indications of the emergency situation to the one or more additional mobile devices, wherein the one or more additional mobile devices are mobile devices within a predetermined physical range of the emergency situation indicated by the first mobile device, and (v) transmits an indication of the emergency situation to one or more local alarm devices in the area, the local alarm devices being in the vicinity of the emergency situation.

14. The invention of claim 13, wherein the mobile device comprises:
a backup power supply to power the mobile device;
wherein, upon entering alert mode, the mobile device is adapted to i) activate the backup power supply, ii) deactivate one or more output devices of the mobile device such that the mobile device appears to be in a powered off state, wherein the one or more output devices include a screen, a ringer, a status light, and a keypad backlight; and ii) transmit periodic update indications of the emergency situation.

15. The invention of claim 13, wherein the alert mode is activated by at least one of: a predefined voice command, a key press of a predefined duration, a predefined key press pattern, and an inertial movement of a predefined strength, and a secondary transmission.

16. The invention of claim 15, wherein the secondary transmission comprises:
activating an alert mode of a secondary transmission device; and
transmitting, by the secondary transmission device, an activation signal to the mobile device, wherein the activation signal activates the alert mode of the mobile device;
wherein the secondary transmission device comprises one of: jewelry, earrings, watches, finger rings, wireless earphones, key rings, key chains, keys, wallets, belts, belt buckles, shoes, shirts, caps, and backpacks.

17. The invention of claim 13, wherein the mobile device further is adapted to record information related to the emergency situation, wherein the recording of information related to the emergency situation comprises recording at least one of audio information, video information, and location information.

18. A system for alarm notification, the system comprising:
a mobile device having an alert mode that is activated based on an emergency situation in an area;
a communication network control system in communication with the mobile device, wherein the mobile device is adapted to transmit an indication of the emergency situation to the communication network control system, and wherein the communication network control system is adapted to, (i) confirm the indication of the emergency situation to the mobile device, (ii) notify emergency personnel of the indication of the emergency situation, (iii) transmits an indication of the emergency situation to one or more additional mobile devices in the area, (iv) transmit periodic update indications of the emergency situation to the one or more additional mobile devices, wherein the one or more additional mobile devices are mobile devices within a predetermined physical range of the emergency situation indicated by the first mobile device, and (v) transmit an indication of the emergency situation to one or more local alarm devices in the area, the local alarm devices being in the vicinity of the emergency situation.

19. The invention of claim 18, wherein the mobile device comprises:
a backup power supply to power the mobile device;
wherein, upon entering alert mode, the mobile device is adapted to i) activate the backup power supply, ii) deactivate one or more output devices of the mobile device such that the mobile device appears to be in a powered off state, wherein the one or more output devices include a screen, a ringer, a status light, and a keypad backlight; and iii) transmit periodic update indications of the emergency situation.

20. The invention of claim 18, wherein the alert mode is activated by at least one of: a predefined voice command, a key press of a predefined duration, a predefined key press pattern, and an inertial movement of a predefined strength, and a secondary transmission,
wherein the secondary transmission comprises:
activating an alert mode of a secondary transmission device; and
transmitting, by the secondary transmission device, an activation signal to the mobile device, wherein the activation signal activates the alert mode of the mobile device;
wherein the secondary transmission device comprises one of: jewelry, earrings, watches, finger rings, wireless earphones, key rings, key chains, keys, wallets, belts, belt buckles, shoes, shirts, caps, and backpacks.

21. The invention of claim 18, wherein the mobile device further is adapted to record information related to the emergency situation, wherein the recording of information related to the emergency situation comprises recording at least one of audio information, video information, and location information.

22. The invention of claim 18, wherein, when the alert mode is activated, the mobile device is adapted to i) record information related to the emergency situation, wherein the information includes at least one of audio information, video information, and location information, and ii) transmit the information to the communication network control system.

23. The invention of claim 22, wherein the information is recorded by communication network control system.

24. The invention of claim 18, wherein, when the alert mode is activated, the communication network control system is adapted to receive acknowledgements for reception of the indication of the emergency situation from a corresponding one or more additional mobile devices in the area.

25. The invention of claim 18, wherein, when the alert mode is activated, the communication network control system repeatedly transmits the indication of the emergency situation to one or more additional mobile devices in the area until reception of the acknowledgement from the corresponding additional mobile device.

26. A method of alarm notification, the method comprising:
   activating an alert mode of a mobile device based on an emergency situation in an area;
   transmitting, from the mobile device, an indication of the emergency situation to a communication network control system;
   confirming, by the communication network control system, the indication of the emergency situation to the mobile device;
   notifying, by the communication network control system, emergency personnel of the indication of the emergency situation; and
   transmitting, by the communication network control system, an indication of the emergency situation to one or more additional mobile devices in the area,
   wherein the alert mode comprises:
      activating a backup power supply to power the mobile device;
      deactivating one or more output devices of the mobile device such that the mobile device appears to be in a powered off state, wherein the one or more output devices include a screen, a ringer, a status light, and a keypad backlight; and
      transmitting, from the mobile device, periodic update indications of the emergency situation.

27. An apparatus for alarm notification, the apparatus comprising:
   a mobile device having an alert mode that is activated based on an emergency situation in an area, the mobile device is adapted to transmit an indication of the emergency situation to a communication network control system,
   wherein the communication network control system, i) confirms the indication of the emergency situation to the mobile device, ii) notifies emergency personnel of the indication of the emergency situation, and iii) transmits an indication of the emergency situation to one or more additional mobile devices in the area, and
   wherein the mobile device comprises a backup power supply to power the mobile device;
   wherein, upon entering alert mode, the mobile device is adapted to, i) activate the backup power supply, ii) deactivate one or more output devices of the mobile device such that the mobile device appears to be in a powered off state, wherein the one or more output devices include a screen, a ringer, a status light, and a keypad backlight; and iii) transmit periodic update indications of the emergency situation.

28. A system for alarm notification, the system comprising:
   a mobile device having an alert mode that is activated based on an emergency situation in an area, wherein the mobile device comprises a backup power supply to power the mobile device;
   a communication network control system in communication with the mobile device, wherein the mobile device is adapted to transmit an indication of the emergency situation to the communication network control system, and wherein the communication network control system is adapted to, i) confirm the indication of the emergency situation to the mobile device, ii) notify emergency personnel of the indication of the emergency situation, and iii) transmit an indication of the emergency situation to one or more additional mobile devices in the area,
   wherein, upon entering alert mode, the mobile device is adapted to, i) activate the backup power supply, ii) deactivate one or more output devices of the mobile device such that the mobile device appears to be in a powered off state, wherein the one or more output devices include a screen, a ringer, a status light, and a keypad backlight; and iii) transmit periodic update indications of the emergency situation.

* * * * *